Patented Sept. 15, 1953

2,652,434

UNITED STATES PATENT OFFICE 2,652,434

ALKYLATION PROCESS

Warren W. Johnstone, Riverside, Ill., assignor to Universal Oil Products Company, Chicago, Ill., a corporation of Delaware No Drawing. Application June 13, 1951, Serial No. 231,422

12 Claims. (Cl. 260—671)

This invention relates to an alkylation process effected in the presence of a novel catalyst disclosed for polymerization in my copending application S. N. 757,065 filed June 25, 1947, now U. S. Patent No. 2,559,576, issued July 3, 1951. It is more particularly concerned with the catalytic alkylation of aromatic compounds.

An object of this invention is to produce an alkylated organic compound and particularly an alkylated aromatic hydrocarbon.

Another object of this invention is to react an alkylatable compound and an olefin-acting compound in the presence of a novel catalyst.

One embodiment of this invention relates to a process which comprises reacting an alkylatable compound and an olefin-acting compound at alkylating conditions in the presence of a catalyst formed by reacting phosphorus pentoxide and boric acid.

Another embodiment of this invention relates to a process which comprises reacting an alkylatable hydrocarbon and an olefin-acting compound at alkylating conditions in the presence of a catalyst formed by reacting phosphorus pentoxide and boric acid.

A further embodiment of this invention relates to a process which comprises reacting an alkylatable aromatic compound and an olefin-acting compound at alkylating conditions in the presence of a catalyst formed by reacting phosphorus pentoxide and boric acid.

A still further embodiment of this invention relates to a process which comprises reacting an aromatic hydrocarbon having a replaceable nuclear hydrogen atom and an olefin-acting compound at alkylating conditions in the presence of a catalyst formed by reacting phosphorus pentoxide and boric acid.

An additional embodiment of this invention relates to a process which comprises reacting a benzene hydrocarbon having a replaceable nuclear hydrogen atom and an olefinic hydrocarbon at alkylating conditions in the presence of a catalyst formed by reacting phosphorus pentoxide and boric acid.

A still additional embodiment of this invention relates to a process for producing an alkylated benzene hydrocarbon which comprises reacting benzene and a monoolefin at an alkylation temperature and pressure in the presence of

and recovering the resultant alkylated benzene hydrocarbon.

Alkylatable compounds which may be used as starting materials in this process comprise hydrocarbons, hydroxy hydrocarbons, and the like. The hydrocarbons include both branched chain alkanes and cyclic hydrocarbons, the preferred cyclic hydrocarbons being those of the aromatic series. The aromatic hydrocarbons including benzene hydrocarbons such as benzene, toluene, the xylenes, ethylbenzene and other alkylbenzenes containing at least 1 replaceable nuclear hydrogen atom. Polycyclic aromatic hydrocarbons such as naphthalene, alkyl naphthalenes and other poly nuclear hydrocarbons which contain at least 1 replaceable nuclear hydrogen atom are also alkylated by olefin-acting compounds as herein set forth. The hydroxy hydrocarbons include particularly the phenols, naphthols and other hydroxy aromatic hydrocarbons, including mono-hydroxy and polyhydroxy aromatic hydrocarbons, an example of the latter being hydroquinone. The aromatic hydrocarbons including the benzene hydrocarbons may be obtained from any source such as by the distillation of coal, by the dehydrogenation of naphthalenic hydrocarbons, by the cyclization of aliphatic hydrocarbons and by other means. The cyclic hydrocarbons also include alkylatable cycloparaffins such as alkylcyclopentane and alkylcyclohexane hydrocarbons. Branched chain paraffins such as isobutane, isopentane and other branched chain alkanes may also be charged to the alkylation treatment as herein set forth.

Suitable alkylating agents which may be charged in this process are olefin-acting compounds including monoolefins, diolefins, polyolefins, also alcohols, ethers, esters, the latter including alkyl halides, alkyl phosphates, certain alkyl sulfates and also esters of various organic carboxylic acids. The preferred alkylating agents are olefinic hydrocarbons which comprise monoolefins having one double bond per molecule and polyolefins which have more than one double bond per molecule. Monoolefins which may be utilized for alkylating aromatic hydrocarbons and other alkylatable compounds in the presence of a borophosphoric acid catalyst are either normally gaseous or normally liquid and include ethylene, propylene, butylenes, pentenes and higher normally liquid olefins, the later including various polymers of gaseous olefins, particularly polymers having from 6 to 18 carbon atoms per molecule. Cycloolefins such as cyclopentene, cyclohexene, and various alkylcycloolefins may also be used. Other unsaturated hydrocarbons used as alkylating agents in this process include conjugated diolefins such as butadiene and isoprene, non-conjugated diolefins, other polyolefin hydrocarbons containing more than two double bonds per molecule, terpenic hydrocarbons, etc.

The catalyst employed in this process is prepared conveniently by mixing powdered phosphorous pentoxide and powdered boric acid and adding thereto a small amount of water. The addition of water initiates a reaction that is accompanied by the evolution of fumes. The resultant mixture is slightly moist, but after drying at 95–100° C., it is dry and nonhygroscopic. A substantial portion of the material appears to correspond to the formula $B_4O_7(H_3P_2O_6)_2$, which may be called tetraborohypophosphoric acid.

The process of this invention may be carried out in batch operation by placing an alkylatable compound and the reaction product of phosphorus pentoxide and boric acid, which is regarded as tetraborohypophosphoric acid, in an autoclave and stirring while an olefin hydrocarbon is added gradually thereto, the reaction mixture being maintained at an elevated temperature at which alkylation of the benzene hydrocarbon takes place. After the reaction has occurred, the reactor is then cooled and the alkylation product is recovered from the resultant reaction mixture.

It is preferred, however, to carry out this process in a continuous manner. This may be accomplished by placing a fixed bed of catalyst within a reactor such as a steel tube and the reactants, that is, the alkylatable compound and the olefin-acting compound are then passed continuously through the bed of catalyst at alkylation conditions. The alkylation product is then recovered from the reactor effluent and any unreacted alkylatable compound and olefin-acting compound may then be recycled to the reaction zone. Fluidized type of operation may also be employed in the presence of the aforementioned catalyst. In this method of operation, a charging stock is passed upwardly through a bed of finely divided catalyst causing the catalyst particles to become set in motion and form a fluid-like mass. Inasmuch as the alkylation reaction is exothermic, a portion of the catalyst may be withdrawn from the reaction zone either intermittently or continuously, the withdrawn catalyst is cooled and then returned to the reaction zone in order to provide a convenient method of temperature control. Another mode of operation which may be employed is the moving bed type of operation wherein a compact bed of the catalyst is passed continuously through the reaction zone either concurrently or countercurrently to the incoming reactants, the catalyst is then passed into a cooling zone from which it is returned to the reaction zone. Another alternative type of operation comprises suspending finely divided solid catalyst in a stream of charging stock and treating said suspension under suitable conditions of temperature and pressure to produce the desired alkylation reaction.

The temperature at which the alkylation process of this invention may be conducted is dependent upon the charging stocks being employed. However, the alkylation process is generally carried out at a temperature of from about 100° C. to about 400° C. and preferably at a temperature of from about 150° C. to about 300° C. Pressure aids the reaction of alkylation and consequently this process is preferably effected at a superatmospheric pressure which is generally not in excess of about 200 atmospheres.

In carrying out the alkylation of aromatic compounds, and particularly of aromatic hydrocarbons, an olefin-acting compound, an olefin-containing hydrocarbon fraction, or other olefin-acting compound may be commingled with a reacting aromatic compound so that the ratio of alkylatable compound to olefin-acting compound in a total mixture charged to the alkylation zone is approximately 5:1 on a molar basis. In some cases this molar ratio of alkylatable compound to olefin may be as low as about 1:1 or as high as 10:1 or even 50:1, the exact ratio being dependent somewhat on the particularly alkylatable compound and olefinic hydrocarbon or other olefin-acting material charged to the process.

Alkylated compounds formed in this process may be used as intermediates for organic synthesis or utilized for other purposes. Thus alkylated aromatic hydrocarbons which are formed from benzene and olefins or from other aromatic hydrocarbons and olefins are useful as starting materials in the production of detergents, insecticides, synthetic rubber, etc. Also certain alkylated hydrocarbons are valuable as motor fuel constituents because of their relatively high octane numbers.

The following examples are given to illustrate this invention but they are introduced with no intention of limiting unduly the generally broad scope of the invention.

*Example I*

A borophosphoric acid catalyst was prepared as follows: Fifty grams of reagent grade boric acid was ground to a powder in a mortar and was then transferred to a large evaporating dish. Fifty-six grams of finely powdered reagent phosphorus pentoxide was then added to the evaporating dish and the materials therein were intimately mixed by stirring with a glass rod for 0.5 hour. The mixture was then pyramided and a few drops of distilled water were added at the apex. A vigorous reaction ensued followed by the evolution of fumes. The wet borophosphoric acid thus produced was then dried overnight in an oven at 95° C. The next morning it was weighed and ground to a powder. The weight of the borophosphoric acid was 93.3 grams. Prior to grinding the borophosphoric acid was gray, but after it had been powdered, it was white.

*Example II*

The borophosphoric acid catalyst prepared as described in Example I is used to catalyze the alkylation of benzene with propylene in an autoclave at a temperature of 275° C. and at a pressure of 175 atmospheres. In this run 150 grams of benzene and 25 grams of tetraborohypophosphoric acid are mixed with stirring in an autoclave at the reaction temperature while 50 grams of propylene is introduced thereto during a time of 30 minutes. The reaction mixture is then stirred at its self-generated pressure for an additional time of 1 hour after which the autoclave and contents are cooled to 25° C. Conversion of the propylene is found to be substantially complete and the reaction mixture is found to contain 0.8 mol of isopropyl benzene and 0.2 mol of diisopropyl benzene.

I claim as my invention:

1. A process which comprises reacting an alkylatable compound and an alkylating agent at alkylating conditions in the presence of a catalyst comprising $B_4O_7(H_3P_2O_6)_2$.

2. A process which comprises reacting an alkylatable hydrocarbon and an alkylating agent at alkylating conditions in the presence of a catalyst comprising $B_4O_7(H_3P_2O_6)_2$.

3. A process which comprises reacting an alklatable aromatic compound and an alkylating agent at alkylating conditions in the presence of a catalyst comprising $B_4O_7(H_3P_2O_6)_2$.

4. A process which comprises reacting an aromatic hydrocarbon having a replaceable nuclear hydrogen atom and an olefin at alkylating conditions in the presence of a catalyst comprising $B_4O_7(H_3P_2O_6)_2$.

5. A process which comprises reacting a benzene hydrocarbon having a replaceable nuclear hydrogen atom and an olefinic hydrocarbon at alkylating conditions in the presence of a catalyst comprising $B_4O_7(H_3P_2O_6)_2$.

6. A process for producing an alkylated benzene hydrocarbon which comprises reacting benzene and a monoolefin at an alkylation temperature and pressure in the presence of $$B_4O_7(H_3P_2O_6)_2$$

and recovering the resultant alkylated benzene hydrocarbon.

7. A process which comprises reacting a benzene hydrocarbon having a replaceable nuclear hydrogen atom with a monoolefin at a temperature of from about 100° to about 400° C. in the presence of a catalyst comprising $B_4O_7(H_3P_2O_6)_2$.

8. The process defined in claim 7 further characterized in that the monoolefin comprises ethylene.

9. The process defined in claim 7 further characterized in that monoolefin comprises propylene.

10. The process defined in claim 7 further characterized in that the monoolefin comprises a butylene.

11. The process defined in claim 7 further characterized in that the monoolefin comprises a pentene.

12. The process defined in claim 7 further characterized in that the monoolefin comprises a monoolefin polymer having from 6 to 18 carbon atoms per molecule.

WARREN W. JOHNSTONE.

References Cited in the file of this patent

UNITED STATES PATENTS

| Number | Name | Date |
|---|---|---|
| 2,525,145 | Mavity | Oct. 10, 1950 |